(12) United States Patent
Mataya

(10) Patent No.: US 7,597,061 B2
(45) Date of Patent: Oct. 6, 2009

(54) BOAT HULL WITH CHANNEL FORMING MEMBER AND METHOD OF MANUFACTURE

(75) Inventor: Robert F. Mataya, Nixa, MO (US)

(73) Assignee: Tracker Marine, L.L.C., Springfield, MO (US)

( * ) Notice: Subject to any disclaimer, the term of this patent is extended or adjusted under 35 U.S.C. 154(b) by 0 days.

(21) Appl. No.: 11/554,321

(22) Filed: Oct. 30, 2006

(65) Prior Publication Data

US 2007/0157866 A1 Jul. 12, 2007

Related U.S. Application Data

(60) Provisional application No. 60/757,927, filed on Jan. 10, 2006.

(51) Int. Cl.
*B63B 1/32* (2006.01)
(52) U.S. Cl. ...................................................... 114/291
(58) Field of Classification Search ................ 114/291, 114/357; 440/89 G
See application file for complete search history.

(56) References Cited

U.S. PATENT DOCUMENTS

| | | | |
|---|---|---|---|
| 3,091,206 A | 5/1963 | Cale | |
| 4,231,314 A | 11/1980 | Peters | |
| 4,689,026 A | 8/1987 | Small | |
| 5,111,767 A | 5/1992 | Haines | |
| 5,490,474 A | 2/1996 | Ikeda | |
| 5,540,174 A | 7/1996 | Kishi et al. | |
| 5,588,392 A * | 12/1996 | Bailey | 114/357 |
| 5,619,950 A | 4/1997 | Ikeda | |
| 5,787,829 A | 8/1998 | Oshima | |
| 6,058,873 A * | 5/2000 | Koyanagi | 114/291 |
| 6,299,496 B1 * | 10/2001 | Griffiths et al. | 440/89 R |
| 6,406,341 B1 * | 6/2002 | Morejohn | 440/69 |
| 6,412,434 B1 | 7/2002 | Kaneko | |
| 2005/0016435 A1 * | 1/2005 | Robinson et al. | 114/291 |
| 2007/0113772 A1 * | 5/2007 | Euton | 114/292 |

* cited by examiner

*Primary Examiner*—Stephen Avila
(74) *Attorney, Agent, or Firm*—Pillsbury Winthrop Shaw Pittman LLP

(57) ABSTRACT

A molded boat hull is provided having a channel forming member extending between a motor mounting transom and an aft riser that forms a step in the bottom portion of the boat hull. The channel forming member has at least one open side and at least an opening in another side to provide a fluid flow communication channel from the atmosphere to the underside of the boat in the step area. The channel forming member is formed as an integral part of the boat hull during forming of the boat hull by molding.

20 Claims, 3 Drawing Sheets

BOAT HULL WITH CHANNEL FORMING MEMBER AND METHOD OF MANUFACTURE

CROSS REFERENCE TO RELATED APPLICATIONS

The application is a non-provisional application based on provisional application Ser. No. 60/757,927, filed Jan. 10, 2006 entitled BOAT HULL WITH CHANNEL FORMING MEMBER AND METHOD OF MANUFACTURE.

BACKGROUND OF THE INVENTION

Various types and shapes of boat hulls are known in the industry. Many boat hulls are specifically designed for planing when operating above a certain speed. To help achieve better high speed planing performance, many boat hulls are provided with a stepped aft portion which allows raising the motor lower unit and propeller relative to the planing surface of the boat bottom and effectively moves the longitudinal center of gravity closer to the aft edge of the planing surface. The step provides an elevated surface portion at the aft end of the boat hull which may be provided with a different contour than the planing surface immediately forward of the stepped portion of the boat hull. While such boat hull designs are effective to help achieve higher speed planning performance, they present some low speed problems.

As suggested above, performance boat hulls that are built to run with outboard engines typically have a transom structure that are designed to handle the power and weight of the outboard motor that is specified for it. Those transoms usually have some sort of reinforcement supporting them that transfers some of the loads from the static and dynamic forces imposed on them to other structural parts of the hull such as stringers and ultimately, to larger areas of the hull skin and or deck structures. The common practice is to install the transom as one operation and component and then follow with the installation of the reinforcing members as another operation and separate components. These reinforcements are often referred to as "knees, braces, gussets, etc.". Often this arrangement is in unison with a step or pocket designed in the hull at the aft end of the planing surface that allows the engine to be mounted higher to reduce drag and effectively moves the propeller aft of the trailing edge of the planning surface, thereby creating a torque that will raise the bow of the boat when under power without excessive trim being applied to the engine. This type of pocket or step makes the transom structure more complex and often creates an area that develops a vacuum or drag at low speeds and impairs the hull's ability to get on plane.

One problem with such a stepped boat hull transom area is the formation of a suction or vacuum that produces drag on the boat during the transition to true planing speeds. To help alleviate this drag problem, various venting systems have been provided that allow air to be fed from the atmosphere to the region of the transom step which has been found to reduce the suction and decrease the drag on the boat during low speed operation. The step also allows raising the propeller relative to the boat bottom which reduces a bow lifting torque induced by the thrust of the propeller and the drag component of the portion of the motor lower unit that is in the water.

One means of providing a vent to the step area on the boat hull bottom was to provide a riser tube in the boat that simply allowed air to be fed to the exterior region of step with the amount of air flow being determined by the level of suction. The higher the suction, the more air drawn and vice versa. While this was effective in reducing suction, it did have problems. When the vent tube was inside of the boat, often times, water would be fed upwardly through the vent tube and into the boat. This was a particular problem during reversing of the direction of the prop thrust for example by putting the motor in reverse. Examples of such a venting system in a watercraft can be found in U.S. Pat. Nos. 6,412,434, 4,689,026 and 4,231,314.

Another venting system can be found in U.S. Pat. No. 5,111,767. In this patent, a boat hull is formed and a separate flow channel forming member is added to the boat hull after the boat hull is formed. It is generally triangularly shaped having two opposing panels defining a channel therebetween. A pair of the side edges defining the member have outwardly extending flanges which are secured to the inside surface of the boat one set of flanges being secured to the transom and one set of flanges being secured to a riser in the boat at the location of the step on the outside of the boat hull. Holes are then drilled through the transom and the riser to provide fluid flow communication of the flow channel in the member and the atmosphere and the region under the boat in the step area. Fluid flow can then be accomplished between the vent holes via the flow channel in the attached member. Water could become trapped within the flow channel in the member and a drain hole is provided. However, keeping the drain hole and the vent holes clean can be problematic and air cannot flow to the step recess until the water in the passage has been evacuated. The evacuation process, if prolonged, can hinder initial planing performance. The member in combination with the transom and boat bottom, formed a closed chamber until holes were formed. Forming the openings requires precise locations of the holes to prevent the formation of a leakage area into the interior of the boat hull and additional manufacturing steps.

There is thus a need for an improved vented boat hull.

SUMMARY OF THE INVENTION

The present invention involves a boat hull form that does not require additional transom reinforcements once the transom itself has been installed, thereby saving the additional costs associated with both the labor and materials required to install them. Further, the hull form is one that is not subject to the performance hindering vacuum often created in aft pockets or steps in the planing surface.

The subject boat hull has an interior and an exterior. The exterior is defined by a bottom portion, bow portion, stern portion and side portions. The bottom portion includes a stepped portion that provides a surface elevated relative to the remainder of the aft or stern bottom portion. The boat hull is provided with a transom for the mounting of an outboard motor or the like. The transom includes inner and outer surfaces extending downwardly toward the elevated surface defining an upper portion of the stepped portion. A channel forming member is positioned in the interior of the boat extending from an inside surface portion of the transom forwardly and downwardly to the riser in the boat hull bottom. The channel forming member has two contiguous side edge portions with at least one of the side edge portions being formed open to the boat exterior. One side edge portion is adjacent to the transom and another side edge portion is adjacent to a generally horizontal wall portion of the stepped portion of the boat hull bottom. At least one of the side edge portions and preferably both of the side portions are open along substantially the entire length of the respective side edge portion. (Both edges are formed open to easily mold the hull and channel member in one piece.) The open portions permit the use of an unitary mold or a mold with an insert or plug during the molding process to form the interior surface and open side edge(s) of the channel member allowing the boat hull to be formed in a single molding step to form the boat hull bottom, sides, bow, transom and channel forming member in one molding step.

The present invention also involves the provision of a method of forming the boat hull by molding wherein the boat hull bottom adjacent to the transom, the transom and the channel forming member are formed as an integral unit in a single molding step. The molding includes positioning of a mold insert to form the interior of the channel forming member and at least one (both sides are preferably open to form the hull in one piece with one molding operation) open side edge of the channel forming member either at the boat hull bottom and/or the transom. The mold plug is preferably fixed to a mold component. The material utilized to form the boat hull including the bottom portion and the transom is laid up over the channel forming mold insert as well as other portions of the mold to permit molding an integral structure of transom, boat bottom and channel forming member in a single step.

Other objects and advantages of the present invention will become apparent from the following detailed description.

BRIEF DESCRIPTION OF THE DRAWINGS

Like numbers throughout the various figures designate like or similar parts or structure.

DETAILED DESCRIPTION

Figure 1:
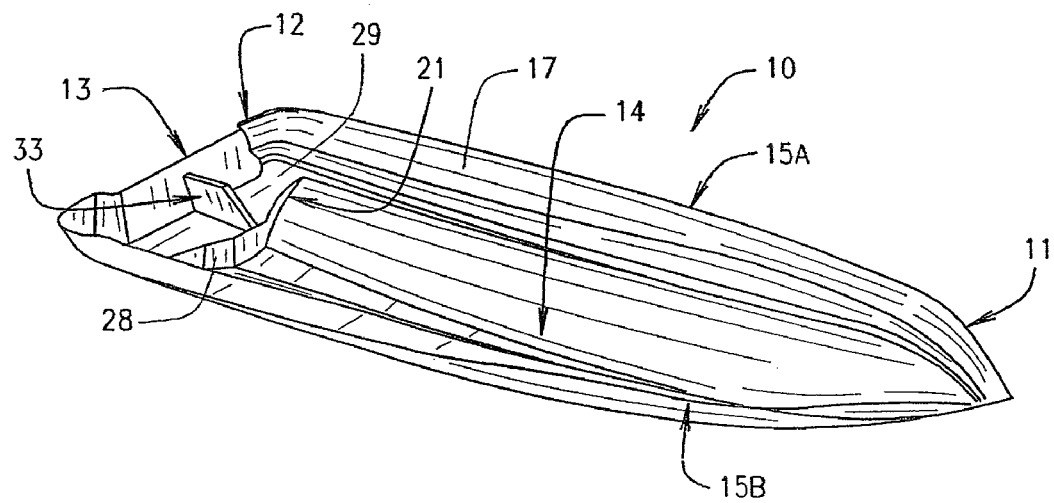
FIG. 1 is a perspective view of a boat hull as viewed from the top of the boat hull showing the boat hull interior.

A molded boat hull designated generally 10 is provided and includes a bow portion 11, a stern or aft portion 12 including a transom 13, a bottom portion 14 and side portions 15A, 15B. The side portions 15, bottom portion 14, bow portion 11 and transom 13 define an upwardly open interior cavity 17. The cavity 17 of the boat hull 10 may be provided with one or more working decks and other suitable equipment such as seats, console, equipment storage lockers, live wells, fuel storage, battery storage and the like. Such boat hulls are well known in the industry.

Figure 2:
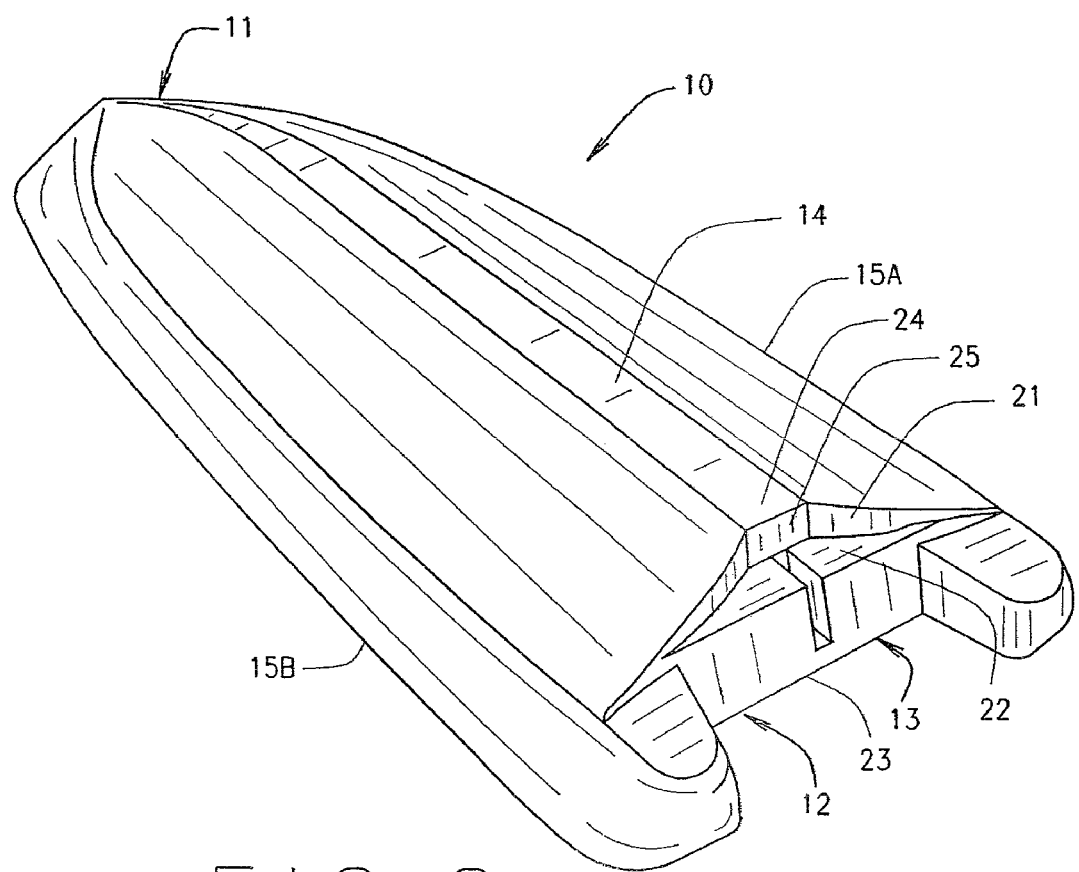
FIG. 2 is a perspective view of the boat hull as viewed from the bottom and stern portion of the boat hull.
Figure 3:
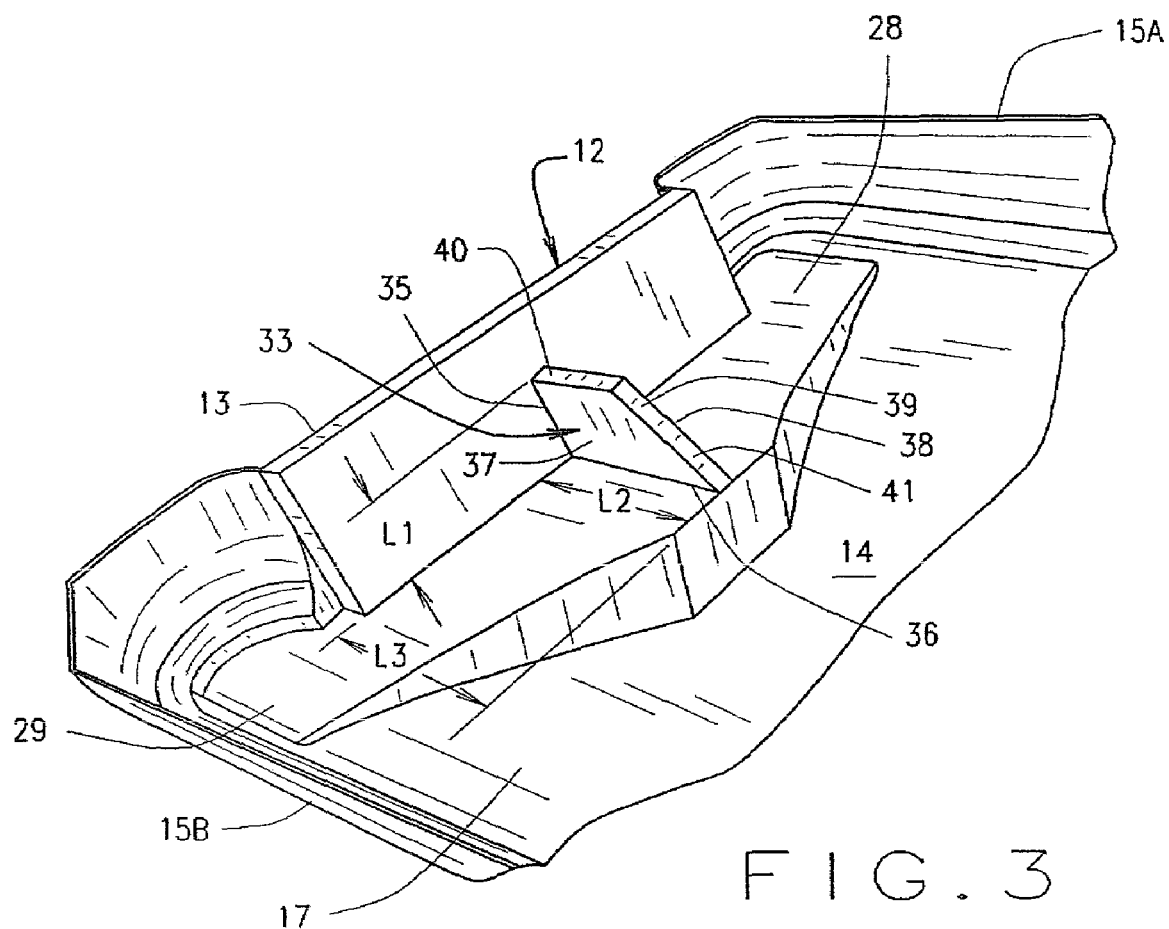
FIG. 3 is an enlarged fragmentary perspective view of the stern portion of the boat hull as seen from the inside of the hull.

The boat hull 10 may be of a shallow draft or a deep draft design and may be of an open hull, a walk through or a closed front design. These designs are also well known in the industry. In the illustrated structure, the boat hull bottom 14 is provided with a stepped area 21 (See FIGS. 1, 2 and 4) providing an elevated outer bottom surface 22 compared to the remainder of the exterior bottom planing surface 24 immediately forward of the stepped area 21. The stepped area 21 is preferably adjacent to and extends forward of the transom 13. The surface 22 defining a portion of the stepped area 21 may be constructed for planing and trim control. Water flowing under the hull bottom 14 flows past the trailing edge 25 (of the planing surface 24 as the boat is forward moving) of the stepped area 21 and creates a suction or pressure reduction in the stepped area bottom recess 26 at low speeds. The edge 25 may be straight or contoured and extends generally transversely across the aft portion 12. The stepped area 21 forms a riser 28 (partially defined by surface 22 when viewed from the bottom) in the cavity 17 (FIG. 3). The riser 28 is shown as comprising a wall member 29, which includes surface 22, and a wall member 30. As shown, the wall member 29 is generally horizontal and the wall member 30 has generally vertical segments 30A, 30B, 30C defining the leading edge of recess 26.

Figure 5:
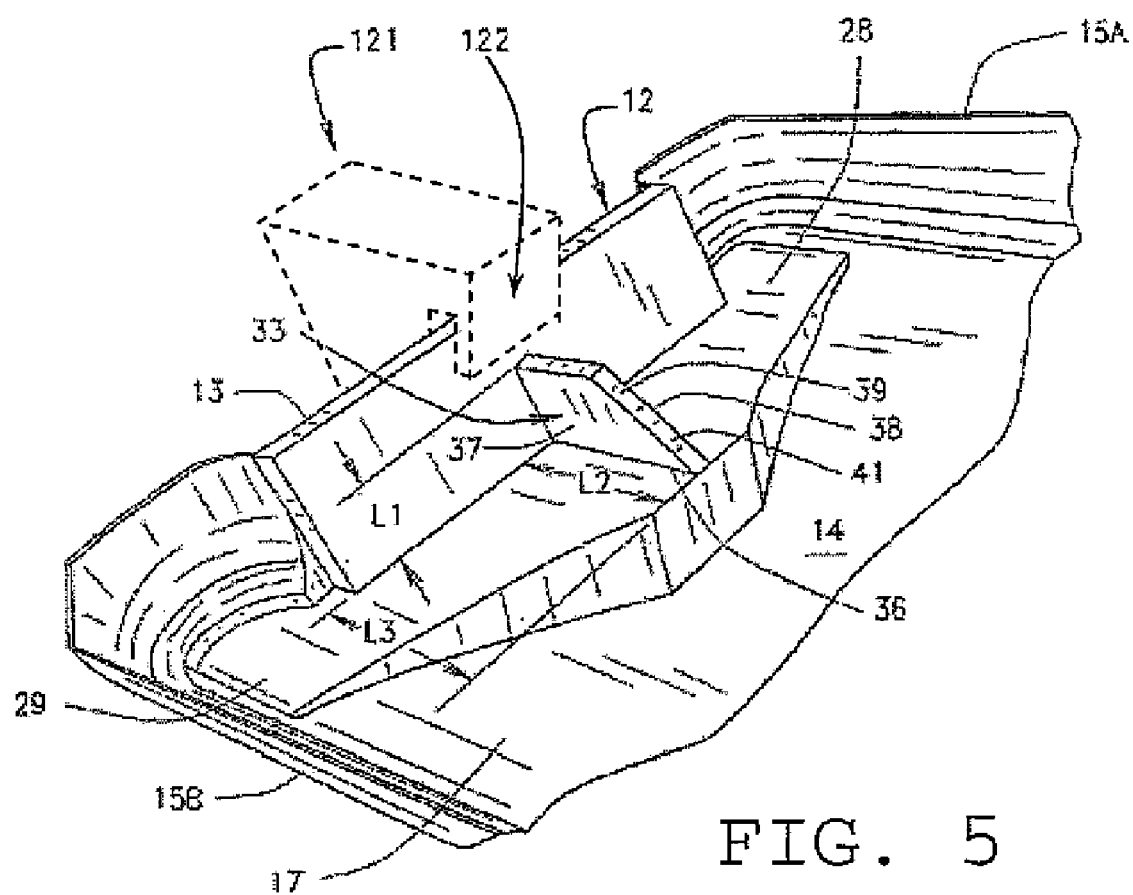
FIG. 5 is an enlarged fragmentary perspective view of the stern portion of the boat hull as seen from the inside of the hull, with an outboard motor mounted to the hull.

As shown in FIG. 5, the transom 13 is designed for the mounting of a so called outboard motor 121 and provides the desired structural strength and rigidity to withstand forces and torque generated by the motor 121 and motor thrust and the boat hull 10 moving through and over the water during operation. The motor 121 will have a lower unit with propeller depending down from the transom to permit positioning of the propeller within the water for operation. The motor 121 may be provided with a mechanism for trimming the motor 121 and also for turning the motor 121 about a pivot axis to help steer the boat during operation. A clamp (or clamps), bolts or other mounting system 122 is typically used to mount the motor to the transom 13 with the clamp mechanism 122 typically including a plurality of screw type clamps for removably securing the clamp mechanism and hence motor to the transom 13. The motor 121 may also be mounted on a mechanism that positions the motor 121 aft of the transom surface 23 some suitable distance. During planing, a significant portion of the bottom 14 lifts from the water permitting the bow 11 to rise from the water to lower the frictional drag of the boat as it moves through the water. The boat then planes on the aft portion planing surface 24 of the boat hull bottom 14 with at least a portion of an air flow channel 31 above the water line. Even before planing, a portion of the channel 31 is above water.

Figure 4:
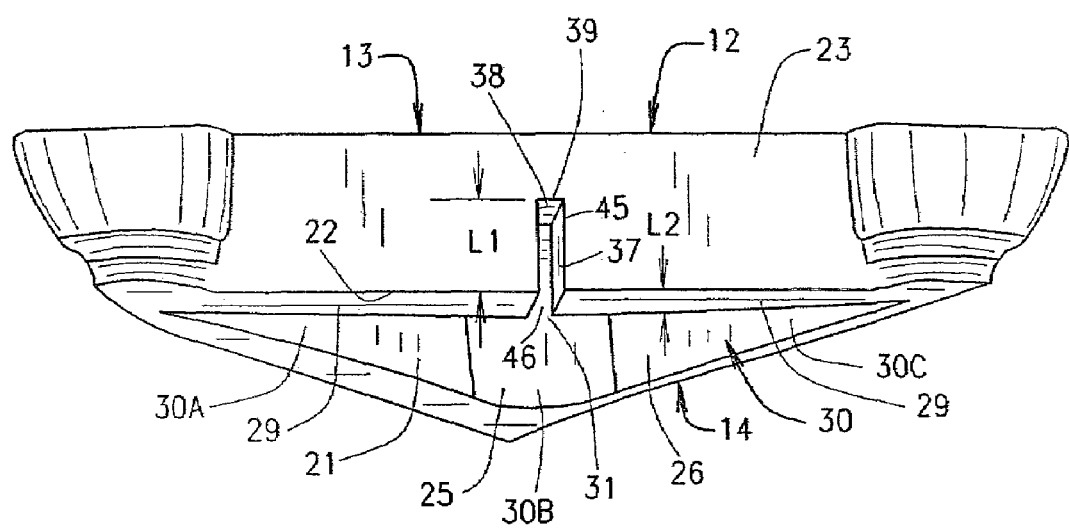
FIG. 4 is an enlarged end view of the stern portion of the boat hull as seen from the outside of the hull.

As best seen in FIGS. 1, 3 and 4, a channel forming member 33 is shown. The member 33 is preferably an integral part of the boat hull 10 extending between the transom and the boat hull bottom 14 preferably in the stepped area 21 and riser 28. As shown, the channel forming member 33 preferably has at least three peripheral sides and as shown, is generally trapezoidal having four sides 35, 36, 40, 41 (FIG. 3) with at least one of the sides being positioned within the cavity 17 of the boat hull 10. One side 35 is positioned at the transom and one side 36 is positioned at the riser 28, and preferably the wall 29. The channel forming member 33 is defined by two spaced apart walls 37, 38 connected by a bight portion 39 which includes sides 40, 41. The walls 37, 38 extend between the sides 35, 36, 40, 41 and form the exteriorly opening flow path channel 31 that preferably has no opening above the top of or into the cavity 17 and is at least substantially sealed from the cavity 17 and preferably completely sealed from cavity 17. The sidewalls 37, 38 and bight portion 39 define the flow path or channel 31 within the channel forming member 33. The channel forming member 33 also functions as a brace to help transmit forces from the transom 13 to the remainder of the boat hull including the riser 28. At least one of the sides 35, 36 of the channel forming member 33 is open on the exterior of the hull 10 along a substantial portion of and preferably the entire length L1, L2 of the sides 35, 36 so that a mold insert or plug can be easily extracted from the channel 31 after formation of the boat hull 10. The mold insert may be fixed to or movable relative to the mold and is preferably fixed to the mold preferably a female mold component. The other side 35, 36 has at least one opening so that air may flow from the atmosphere to the stepped area 21 recess 26 through the channel 31. Preferably, two sides 35, 36 of the channel forming member 33 are at least substantially completely open with those sides being the transom side 35 and the bottom side 36. An air flow path 31 is thus provided between the atmosphere and the stepped area 21 recess 26 so that air can flow from the atmosphere to the stepped area to reduce suction. Preferably, the opening 45 at the transom side 35 has the opening 45 extending as high up as is practical for the overall design and above the water line during operation and before planing is reached. The bottom edge opening 46 extends forwardly from the transom and preferably the entirety of the longitudinal length L3 of the stepped area at the channel member 33. Preferably, the channel forming member 33 is positioned generally centrally laterally between the opposite side edges of the transom 13. Although one channel forming member 33 is illustrated, it is to be understood that a plurality of channel forming members can be provided as desired and are positioned transversely so as to not interfere with the mounting of the motor.

The present invention also includes a method of making a boat hull wherein the transom 13, channel forming member 33 or channel forming members and boat hull bottom portion 14, at least adjacent the transom, are formed in a single step molding process. The molding can be done in either open or closed mold processes and the closed mold process can be with either rigid mold halves or one rigid mold half and a flexible mold half. One molding method that is suitable is disclosed in co-pending patent application Ser. No. 10/795, 858, filed Mar. 8, 2004 and entitled "Closed Molding Tool", the entire disclosure of which is incorporated herein by reference. A polymeric resin and reinforcing fibers are placed on the appropriate mold half or component. Generally, the fibrous material is first laid up on the mold component and after lay-up is impregnated with resin. After the impregnation of the fibers with resin, the resin is allowed to or induced to harden forming a rigid molded part. The present invention involves the utilization of an unitary female mold or a female mold with a male insert or mold plug that is fixed to and positioned in the female mold and is preferably mounted to and extends from a mold portion forming the outside of the transom to a mold portion forming the outside of the riser 28. The insert may also be mounted to the mold portion forming the riser 28. The insert is positioned and shaped so as to permit removal of the boat hull from the mold after the resin has hardened. The mold insert or mold plug that forms the channel 31 of the channel forming member 33 can be fixed to the boat mold or may be constructed for removal from the formed boat hull prior to removal of a hardened boat hull from the mold. After the fibrous material is formed to shape, the resin is allowed to harden. Hardening can be induced by chemical reaction, heat and/or certain types of electromagnetic radiation for example certain wave lengths of light. The boat hull may also be vacuum formed from a sheet of polymeric material if desired.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The invention claimed is:

1. A boat hull including:
  a bow portion;
  a stern portion with a transom;
  a pair of sidewall portions;
  a bottom portion having a step portion adjacent the stern portion, said bow portion, stern portion, sidewall portions, and bottom portion defining an upwardly opening cavity; and
  a channel forming member integrally molded into the hull as a single piece with the hull, the channel forming member being integral with the transom and the bottom portion and forming a flow path therebetween for providing fluid communication between the step portion and the atmosphere, said channel forming member being an integrally molded part of the bottom portion and transom and being positioned at least partially in the cavity, said channel forming member having a first side at the bottom portion and a second side at the transom, at least one of the first side and second side being open along at least a substantial portion of its length,
  wherein both of the first and second sides are open along at least a substantial portion of their respective lengths.

2. The boat hull as set forth in claim 1 wherein the channel forming member having an interior channel defined at least partially by a pair of spaced sidewalls, said sidewalls each extending between a respective side edge of each of the first and second open sides, said channel being oriented and shaped to receive a male mold plug therein during molding of the boat hull.

3. A boat hull including:
  a bow portion;
  a stern portion with a transom;
  a pair of sidewall portions;
  a bottom portion having a step portion adjacent the stern portion, said bow portion, stern portion, sidewall portions, and bottom portion defining an upwardly opening cavity; and
  a channel forming member integrally molded into the hull as a single piece with the hull, the channel forming member being integral with the transom and the bottom portion and forming a flow path therebetween for providing fluid communication between the step portion and the atmosphere, said channel forming member being an integrally molded part of the bottom portion and transom and being positioned at least partially in the cavity, said channel forming member having a first side at the bottom portion and a second side at the transom, at least one of the first side and second side being open along at least a substantial portion of its length
  wherein the channel forming member extending between the transom and a wall member portion of the step portion, and
  wherein the wall member is generally horizontal.

4. The boat hull as set forth in claim 3 wherein the channel forming member defining a channel opening on the transom exterior and the wall member exterior along first and second sides of the channel forming member respectively.

5. The boat hull as set forth in claim 4 wherein the channel opening on the transom along at least substantially the entire length of the first side.

6. The boat hull as set forth in claim 5 wherein the channel opening on the wall member along at least substantially the entire length of the second side.

7. The boat hull as set forth in claim 6 wherein the channel forming member including a pair of spaced apart second sidewalls extending between the transom and the wall member in the cavity.

8. The boat hull as set forth in claim 7 wherein the channel forming member including a bight member extending between and integral with the second sidewalls.

9. The boat hull as set forth in claim 8 wherein the channel being sealed from the cavity.

10. The boat hull as set forth in claim 1 wherein the channel being sealed from the cavity.

11. The boat hull of claim 1, wherein the transom comprises an outboard motor mount.

12. The boat hull of claim 11, in combination with an outboard motor mounted to the outboard motor mount of the transom.

13. The boat hull of claim 1,
wherein the transom comprising an outboard motor mount; and
the step portion extends transversely across a majority of a width of the hull.

14. The hull of claim 13, wherein the first open end extends continuously into the second open end so as to define a common opening along an underside of the hull that extends from the step portion to the transom.

15. The hull of claim 14, wherein
said bow portion, stern portion, sidewall portions, and bottom portion define an upwardly opening cavity;
the hull further comprises a channel forming member that defines the channel and is positioned at least partially in the cavity, said channel forming member having a first side at the bottom portion and a second side at the transom, the channel forming member reinforcing a connection between the transom and the step portion.

16. The boat hull of claim 13, wherein the channel is integrally molded with the hull as a single piece with the hull.

17. The boat hull of claim 13, in combination with an outboard motor mounted to the outboard motor mount of the transom.

18. The boat hull of claim 16, wherein the step portion comprises:
a first generally horizontal wall member; and
a second wall member that extends between and vertically offsets the first generally horizontal wall member and a remainder of the bottom portion.

19. The hull of claim 13, wherein the first open end extends continuously into the second open end so as to define a common opening along an underside of the hull, the common opening causing the channel to be bottomless and continuously exteriorly open from the step portion to the transom.

20. The hull of claim 13, wherein the channel defines an exteriorly open, bottomless slot in the hull, the slot having a continuously open opening that opens into both the exterior of the step portion and the exterior of the transom.

* * * * *